United States Patent
Park

(10) Patent No.: US 7,617,419 B2
(45) Date of Patent: Nov. 10, 2009

(54) APPARATUS AND METHOD FOR MANAGING RANDOM-DIRECTIONAL SCRATCHES ON HARD DISK

(75) Inventor: Moon-chol Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 756 days.

(21) Appl. No.: 10/732,248

(22) Filed: Dec. 11, 2003

(65) Prior Publication Data

US 2004/0158769 A1   Aug. 12, 2004

(30) Foreign Application Priority Data

Dec. 12, 2002   (KR) .................. 10-2002-0079269

(51) Int. Cl.
  *G06F 11/00* (2006.01)
(52) U.S. Cl. .......................... 714/42; 714/5
(58) Field of Classification Search .......... 714/5, 714/26, 42; 360/53, 48, 47; 369/30.11, 30.14, 369/30.21, 30.22, 30.24, 44.32, 53.15, 53.17, 369/275.5
  See application file for complete search history.

(56) References Cited

U.S. PATENT DOCUMENTS

| | | | |
|---|---|---|---|
| 6,081,411 A | | 6/2000 | Green et al. |
| 6,223,303 B1* | | 4/2001 | Billings et al. .......... 714/8 |
| 6,557,125 B1* | | 4/2003 | Rochat et al. .......... 714/704 |
| 2001/0055172 A1* | | 12/2001 | Yip et al. .......... 360/48 |
| 2002/0191319 A1* | | 12/2002 | Liew et al. .......... 360/53 |
| 2004/0100715 A1 | | 5/2004 | Smith et al. |
| 2004/0236985 A1* | | 11/2004 | Durica et al. .......... 714/7 |
| 2005/0138464 A1* | | 6/2005 | Chong et al. .......... 714/5 |

FOREIGN PATENT DOCUMENTS

| | | |
|---|---|---|
| JP | 03-228265 | 10/1991 |
| JP | 7-334933 | 12/1995 |
| JP | 2001-176001 | 6/2001 |
| KR | 1999-65646 | 8/1999 |
| KR | P1999-0065646 * | 8/1999 |
| WO | WO 01/31651 A1 | 5/2001 |

OTHER PUBLICATIONS

Notice of Office Action issued in Application No. 10-2002-79269, by the Korean Patent Office on Jan. 13, 2005, with an English language translation thereof.
The First Office Action issued by the Japanese Patent Office on Dec. 12, 2006 in the corresponding Japanese Application No. 2005-020096 (2 pages).
International Business Machines Corporation; "The new procedure to search contiguous defects", Research Disclosure, Mason Publications, Hampshire, GB, vol. 450, No. 124, Oct. 2001.
European Search Report, Feb. 5, 2009.

* cited by examiner

*Primary Examiner*—Robert Beausoliel
*Assistant Examiner*—Joseph D Manoskey
(74) *Attorney, Agent, or Firm*—Staas & Halsey LLP

(57) ABSTRACT

An apparatus and method for managing random-directional scratches on a hard disk. The apparatus includes a scratch determination unit and an alleged defect setting unit. The scratch determination unit determines that predetermined sectors are affected by a single continuous scratch if the predetermined sectors are defective and a distance therebetween is not larger than the length of a single continuous scratch. The alleged defect setting unit sets sectors between the predetermined sectors and around each of the predetermined sectors as alleged defective sectors if the defective sectors are determined to be affected by the single continuous scratch.

27 Claims, 11 Drawing Sheets

APPARATUS AND METHOD FOR MANAGING RANDOM-DIRECTIONAL SCRATCHES ON HARD DISK

CROSS-REFERENCE TO RELATED APPLICATIONS

This application claims the priority of Korean Patent Application No. 2002-79269, filed on Dec. 12, 2002, in the Korean Intellectual Property Office, the disclosure of which is incorporated herein in its entirety by reference.

BACKGROUND OF THE INVENTION

1. Field of the Invention

The present invention relates to an apparatus and method for managing a defect caused by scratches on a hard disk, and more particularly, to a hard disk drive defect-free algorithm which makes it possible to record user data on normal sectors rather than defective sectors by putting alleged defects on a defect list.

2. Description of the Related Art

Figures 1, 2, 3:
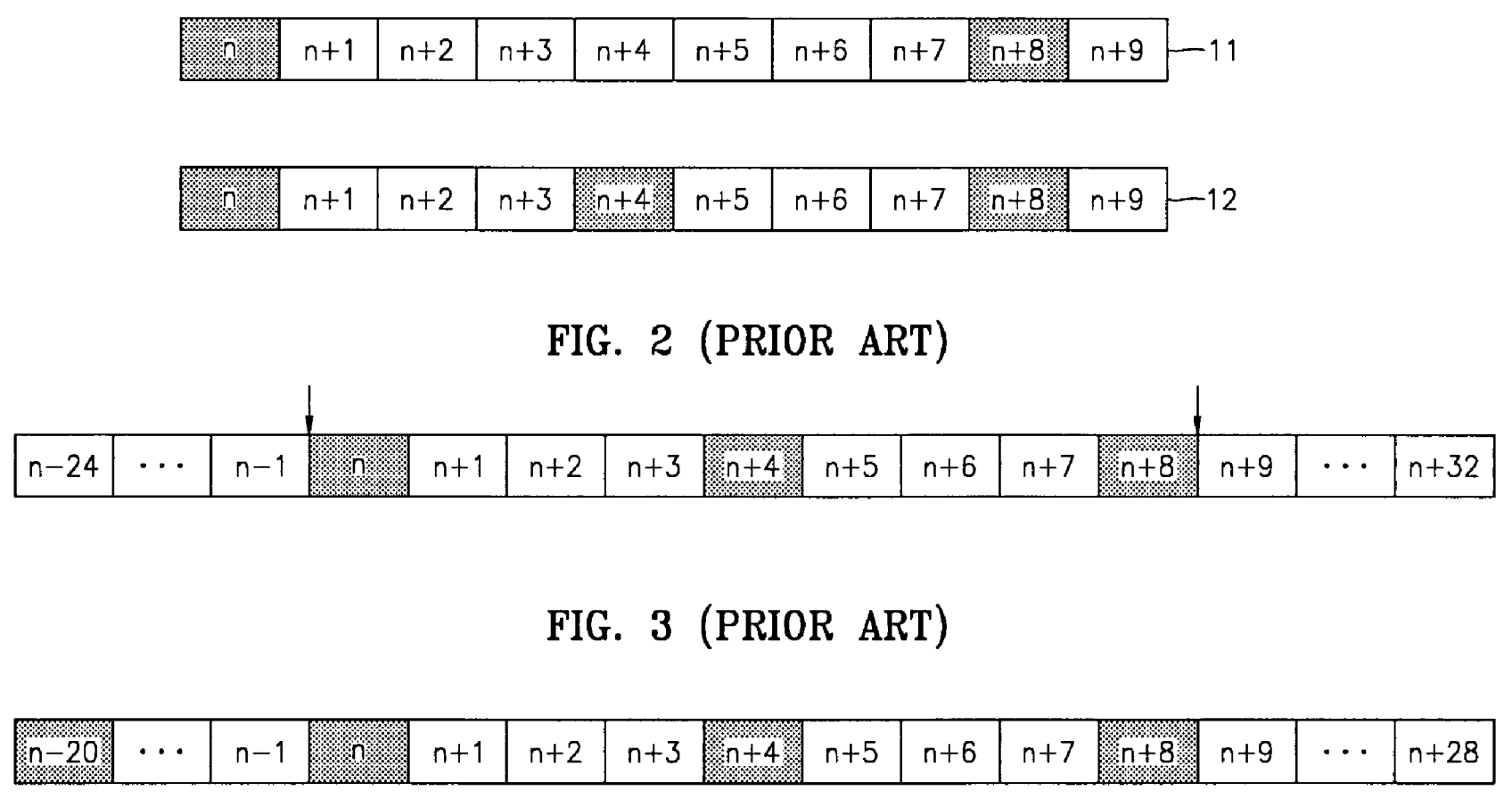

FIG. 1 is a diagram illustrating a first operation of a method of managing vertical scratches using a conventional algorithm. Referring to FIG. 1, let us assume that information indicating that an n-th track has a defective sector is read from a defect list (11). Then, the next ten vertically adjacent tracks, ranging from the n-th track to an n+9-th track, are checked for a defective sector. As shown in FIG. 1, the n+8-th track also has a defective sector. Because there is another track having a defective sector other than the n-th track among the ten vertically adjacent sectors, sectors of the ten vertically adjacent tracks are all set as alleged defective sectors and then treated as a scratch.

Alternatively, supposing that information that an n-th track has a defective sector is drawn from a defect list (12), then ten vertically adjacent tracks, ranging from the n-th track to an n+9-th track, are checked for a defective sector. As shown in FIG. 1, if there is more than one track having a defective sector among the ten vertically adjacent tracks, a defective sector of the track that is farthest away from the n-th track among those having a defective sector is set as a target sector. In FIG. 1, a defective sector of an n+8-th track could be the target sector. Thereafter, all sectors of the ten vertically adjacent tracks from the n-th track to the n+9-th track are set as alleged defective sectors and then treated as a scratch.

FIG. 2 is a diagram illustrating a second operation of the method of managing a vertical scratch using the conventional algorithm. After the first operation of FIG. 1, lower tracks of the n-th track are checked for a defective sector. For example, if there is a track having a defective sector among 24 lower tracks of the n-th track, all sectors between the defective track of the corresponding track and the defective sector of the n-th track are set as alleged defective sectors and then treated as including a scratch. Likewise, upper tracks of the n-th track are checked for a defective sector. For example, if there is a track having a defective sector among 24 upper tracks of the n-th track, all sectors between the defective track of the corresponding track and the defective sector of the n-th track are set as alleged defective sectors and then treated as a scratch.

FIG. 3 is a diagram illustrating a third operation of the method of managing a vertical scratch using the conventional algorithm. As shown in FIG. 3, if there are defective sectors between an n−20-th track and an n+28-th track, all sectors therebetween are set as alleged defective sectors and then treated as a scratch. More specifically, the size of a scratch is calculated using the following equation: size=(defect length)/8+5. Thereafter, as large an area of a hard disk as the calculation result is treated as a scratch. For example, in the case of the tracks of FIG. 3, the calculated size of a scratch amounts to (49/8+5). Therefore, as many lower tracks of the n−20-th track as (49/8+5) and as many upper tracks of the n+28-th track as (49/8+5) are additionally treated as a scratch.

As a part of a device, a hard disk seldom includes scratches on the surface until it is assembled into a device along with other parts. However, since a hard disk and a head/disk assembly (HAD) are jig-assembled by moving a head along a pivot of the hard disk with the hard disk at a standstill, an arc-shaped scratch can be formed along the trajectory of the head. The arc-shaped scratch can be seen as being perpendicular to a track direction of the hard disk from a microscopic point of view. Conventionally, scratch filling has been generally performed in expectation of only vertical scratches.

Nowadays, however, hard disk drives are manufactured to be capable of rotating at higher revolutions-per-minute (RPM) and to have higher track-per-inch (TPI) and higher bits-per-inch (BPI) as a result of increasing storage capacities. Accordingly, it becomes more likely that scratches will be more easily formed on the surface of hard disks in random directions, particularly, in a slant-line direction or a horizontal direction with respect to the track direction of the hard disks, because of physical impact on the hard disks or because of a head moving back and forth over a hard disk while the hard disk rotates. However, conventional vertical scratch filling is not efficient enough to treat such random-directional scratches, and thus a brand-new technique of managing random-directional scratches on a hard disk is necessary.

SUMMARY OF THE INVENTION

The present invention provides an apparatus and method for managing random-directional scratches on a hard disk by anticipating and recovering defects that could be caused by the random-directional scratches.

Additional aspects and/or advantages of the invention will be set forth in part in the description which follows and, in part, will be obvious from the description, or may be learned by practice of the invention.

According to an aspect of the present invention, there is provided an apparatus for managing random-directional scratches on a hard disk. The apparatus includes a scratch determination unit and an alleged defect setting unit. The scratch determination unit determines that predetermined sectors are affected by a single continuous scratch if the predetermined sectors are defective and a distance therebetween is not larger than a predetermined scratch length. The alleged defect setting unit sets sectors between the predetermined sectors and around each of the predetermined sectors as alleged defective sectors if the defective sectors are determined to be affected by the single continuous scratch.

According to another aspect of the present invention, there is provided an apparatus for managing random-directional scratches on a hard disk. The apparatus includes a scratch determination unit, an in-between alleged defect setting unit, and an either-end alleged defect setting unit. The scratch determination unit determines an m-th sector of an M-th track and an n-th sector of an N-th track to be affected by a single continuous scratch if the m-th sector of the M-th track and the n-th sector of the N-th track are defective, a difference between M and N is equal to a predetermined scratch treatment conditional value, and a difference between m and n is not larger than a predetermined scratch-treatment critical value. The in-between alleged defect setting unit sets sectors between the m-th sector of the M-th track and the n-th sector of the N-th track as alleged defective sectors if the m-th sector of the M-th track and the n-th sector of the N-th track are determined to be affected by the single continuous scratch and the difference between m and n is larger than 1. The either-end alleged defect setting unit sets predetermined sectors around the m-th sector of the M-th track and the n-th sector of the N-th track as alleged defective sectors if the m-th sector of the M-th track and the n-th sector of the N-th track are determined to be affected by the single continuous scratch and the difference between m and n is smaller than the scratch-treatment critical value.

According to another aspect of the present invention, there is provided an apparatus for managing random-directional scratches on a hard disk. The apparatus includes a scratch determination unit and an alleged defect setting unit. The scratch determination unit determines an m-th sector of an M-th track and an n-th sector of an N-th track to be affected by a single continuous scratch if the m-th sector of the M-th track and the n-th sector of the N-th track are defective, a difference between M and N is equal to a predetermined scratch treatment conditional value, and a difference between m and n is not larger than a predetermined scratch-treatment critical value. The alleged defect setting unit sets sectors between the m-th sector of the M-th track and the n-th sector of the N-th track as alleged defective sectors, if the m-th sector of the M-th track and the n-th sector of the N-th track are determined to be affected by the single continuous scratch and the difference between m and n is larger than 1, and sets predetermined sectors around the m-th sector of the M-th track and the n-th sector of the N-th track as alleged defective sectors if the m-th sector of the M-th track and the n-th sector of the N-th track are determined to be affected by the single continuous scratch and the difference between m and n is smaller than the scratch-treatment critical value.

According to another aspect of the present invention, there is provided a method of managing random-directional scratches on a hard disk. The method involves determining that predetermined sectors are affected by a single continuous scratch if the predetermined sectors are defective and a distance therebetween is not larger than a predetermined scratch length; and setting sectors between the predetermined sectors and around each of the predetermined sectors as alleged defective sectors if the defective sectors are determined to be affected by the single continuous scratch.

According to another aspect of the present invention, there is provided a method of managing random-directional scratches on a hard disk. The method involves determining an m-th sector of an M-th track and an n-th sector of an N-th track to be affected by a single continuous scratch if the m-th sector of the M-th track and the n-th sector of the N-th track are defective, a difference between M and N is equal to a predetermined scratch treatment conditional value, and a difference between m and n is not larger than a predetermined scratch-treatment critical value; setting sectors between the m-th sector of the M-th track and the n-th sector of the N-th track as alleged defective sectors if the m-th sector of the M-th track and the n-th sector of the N-th track are determined to be affected by the single continuous scratch and the difference between m and n is larger than 1; and setting predetermined sectors around the m-th sector of the M-th track and the n-th sector of the N-th track as alleged defective sectors if the m-th sector of the M-th track and the n-th sector of the N-th track are determined to be affected by the single continuous scratch and the difference between m and n is smaller than the scratch-treatment critical value.

According to another aspect of the present invention, there is provided a method of managing random-directional scratches on a hard disk. The method involves determining an m-th sector of an M-th track and an n-th sector of an N-th track to be affected by a single continuous scratch if the m-th sector of the M-th track and the n-th sector of the N-th track are defective, a difference between M and N is equal to a predetermined scratch treatment conditional value, and a difference between m and n is not larger than a predetermined scratch-treatment critical value; and setting sectors between the m-th sector of the M-th track and the n-th sector of the N-th track as alleged defective sectors, if the m-th sector of the M-th track and the n-th sector of the N-th track are determined to be affected by the single continuous scratch and the difference between m and n is larger than 1, and sets predetermined sectors around the m-th sector of the M-th track and the n-th sector of the N-th track as alleged defective sectors if the m-th sector of the M-th track and the n-th sector of the N-th track are determined to be affected by the single continuous scratch and the difference between m and n is smaller than the scratch-treatment critical value.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 1 is a diagram illustrating a first operation of a method of managing a vertical scratch using a conventional algorithm;

FIG. 2 is a diagram illustrating a second operation of the method of managing the vertical scratch using the conventional algorithm;

FIG. 3 is a diagram illustrating a third operation of the method of managing the vertical scratch using the conventional algorithm;

DETAILED DESCRIPTION OF THE EMBODIMENTS

Figure 4A:
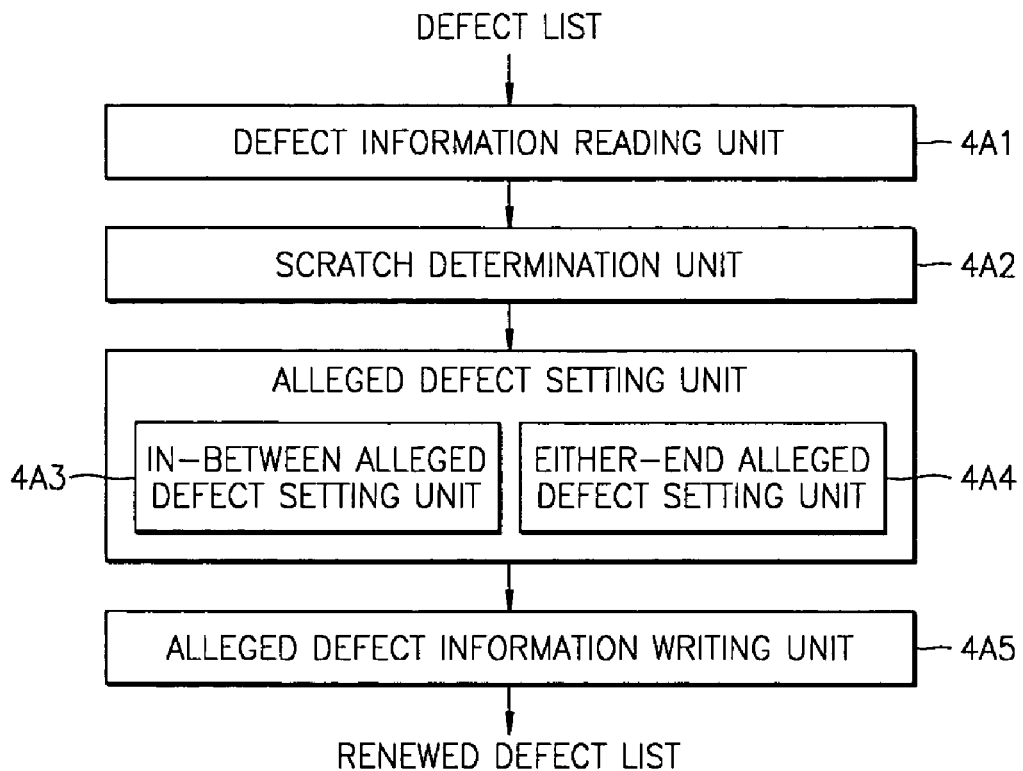
FIG. 4A is a block diagram of an apparatus for managing random-directional scratches on a hard disk according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 4A is a block diagram of an apparatus for managing random-directional scratches on a hard disk according to an embodiment of the present invention. Referring to FIG. 4A, the apparatus includes a defect information reading unit 4A1, a scratch determination unit 4A2, an in-between alleged defect setting unit 4A3, an either-end alleged defect setting unit 4A4, and an alleged defect information writing unit 4A5.

The defect information reading unit 4A1 reads information on defects from memory where a predetermined defect list is stored. As described above, a hard disk, as a part of a device, seldom includes scratches on the surface until it is assembled into a hard disk drive along with other parts. In the process of assembling the hard disk into a hard disk drive along with other parts, scratches are likely to be generated on the hard disk because of physical contacts between the hard disk and other parts. After the assembly, the hard disk is supposed to undergo a couple of tests, i.e., a burn/in (B/I) test (which is performed for a predetermined amount of time under specific conditions to pre-screen all parts of a device to detect defects) and a function test. During these tests, scratches may be formed on the hard disk because of head slaps or other types of physical impact on the hard disk. The defect list can be made after inspecting the surface of the hard disk to detect defects and putting detected defects on a list. The defect list is stored in nonvolatile memory in a hard disk drive. As described above, the defect information reading unit 4A1 can identify which sectors are defective by reading the defect information from the memory where the defect list is stored. However, because of imprecision of a head, it may not be possible to detect all the defects that the hard disk has through the inspection of the surface of the hard disk. In the present invention, all sectors that allegedly have defects are sorted out, and thus it looks, from a PC's point of view, as if there were no bad sectors on the hard disk. This type of technology is called defect management.

In a case where an m-th sector of an M-th track and an n-th sector of an N-th track are defective, the scratch determining unit 4A2 determines that the m-th sector and the n-th sector are affected by a single continuous scratch, only when a difference between M and N is equal to a predetermined scratch treatment conditional value and a difference between m and n is not larger than a predetermined scratch-treatment critical value. Here, the scratch treatment conditional value is a benchmark value for determining whether the M-th track and the N-th track are affected by a single continuous scratch, and the scratch-treatment critical value is a benchmark value for determining whether the m-th sector and the n-th sector are affected by a single continuous scratch. More specifically, the scratch-treatment critical value indicates the length of scratches that could be usually formed across or along tracks of hard disks during assembly or test processes. The difference between m and n indicates the distance between the m-th sector and the n-th sector. If the distance between the m-th sector and the n-th sector is not larger than the length of usual scratches, the scratch determining unit 4A2 determines that the m-th sector and the n-th sector are affected by a single continuous scratch.

If the m-th sector and the n-th sector are determined to be affected by a single continuous scratch, the in-between alleged defect setting unit 4A3 determines whether the difference between m and n is larger than 1 and then sets all sectors between the m-th and n-th sectors of each of the M-th and N-th tracks as alleged defective sectors if the difference between m and n is larger than 1. As described above, the difference between m and n indicates the distance therebetween. When the difference m and n is larger than 1, the m-th sector and the n-th sector are supposedly not adjacent to each other but separate. In this case, the in-between alleged defect setting unit 4A3 sets all sectors between the m-th sector and the n-th sector as alleged bad sectors, i.e., alleged defective sectors because they are alleged to be bad sectors.

If the m-sector and the n-th sector are determined to be affected by a single continuous scratch and the difference between m and n is smaller than the scratch-treatment critical value, the either-end alleged defect setting unit 4A4 sets predetermined sectors around the m-th and n-th sectors as alleged defective sectors. It is safe to say that it is unlikely that a scratch begins from the m-th sector and ends with the n-th sector because sectors are very minute areas on a hard disk and scratches are generally formed on a hard disk during manufacturing it or using it. Therefore, if the m-th sector of the M-th track and the n-th sector of the N-th track are determined to be affected by a single continuous scratch, the either-end alleged defect setting unit 4A4 sets predetermined sectors around the m-th sector of the M-th track and predetermined sectors around the n-th sector of the N-th track as alleged defective sectors in consideration of an estimated length of the single continuous scratch. In other words, the either-end alleged defective setting unit 4A4 sets as many sectors around the m-th sector of the M-th track as a difference between the scratch-treatment critical value and the difference between m and n as alleged defective sectors. Likewise, the either-end alleged defective setting unit 4A4 also sets as many sectors around the n-th sector of the N-th track as the difference between the scratch-treatment critical value and the difference between m and n as alleged defective sectors.

The alleged defective information writing unit 4A5 writes information on the alleged defective sectors set by the in-between alleged defect setting unit 4A3 and the either-end alleged defect setting unit 4A4 in the memory where the defect list is stored. The information on the alleged defective sectors, i.e., addresses of the alleged defective sectors, are put on the defect list so that all the alleged defective sectors can be sorted out and a PC can manage the hard disk as if there were no defective sectors on the hard disk.

Figure 4B:
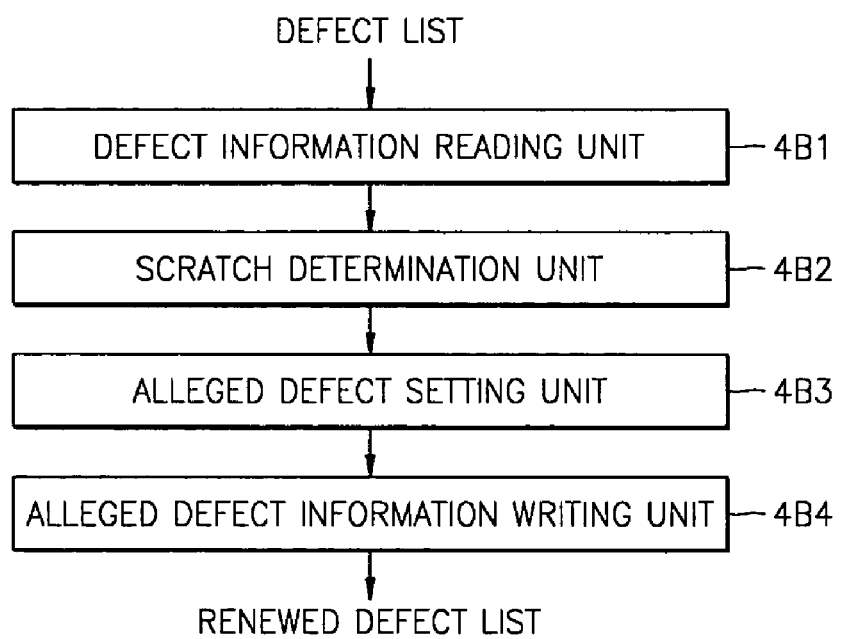
FIG. 4B is a block diagram of an apparatus for managing slant-line-directional scratches on a hard disk according to an embodiment of the present invention.

FIG. 4B is a block diagram of an apparatus for managing slant-line-directional scratches on a hard disk according to an embodiment of the present invention. Referring to FIG. 4B, the apparatus includes a defect information reading unit 4B1, a scratch determination unit 4B2, an alleged defect setting unit 4B3, and an alleged defect information writing unit 4B4.

The defect information reading unit 4B1 reads information on defects on a hard disk from memory where a predetermined defect list is stored. In a case where an m-th sector of an M-th track and an n-th sector of an N-th track are defective, the scratch determining unit 4B2 determines that the m-th sector and the n-th sector are affected by a single continuous scratch, only when a difference between M and N is equal to a predetermined scratch treatment conditional value and a difference between m and n is not larger than a predetermined scratch-treatment critical value. Here, the scratch treatment conditional value is a benchmark value for determining whether the M-th track and the N-th track are affected by a single continuous scratch, and the scratch-treatment critical value is a benchmark value for determining whether the m-th sector and the n-th sector are affected by a single continuous scratch.

If the m-th sector and the n-th sector are determined to be affected by a single continuous scratch and a difference between m and n is larger than 1, the alleged defect setting unit 4B3 sets sectors between the m-th and n-th sectors of each of the M-th and N-th tracks and predetermined sectors around the m-th sector and the n-th sector as alleged defective sectors. More specifically, the alleged defect setting unit 4B3 sets sectors within as long a predetermined distance from the m-th sector and the n-th sector as a difference between the scratch-treatment critical value and the difference between m and n as alleged defective sectors.

The alleged defect information writing unit 4B4 writes information on the alleged defective sectors, set by setting unit 4B3, in the memory where the defect list is stored.

Supposing that an m-th sector of an M-th track and an n-th sector of an N-th track are defective, M≠N, and m≠n, a straight line connecting the m-th sector of the M-th track and the n-th sector of the N-th track extends along a slant-line-direction with respect to a track direction of the hard disk. If m and n have fixed values, the gradient of the straight line increases in proportion to M and N.

Figure 5:
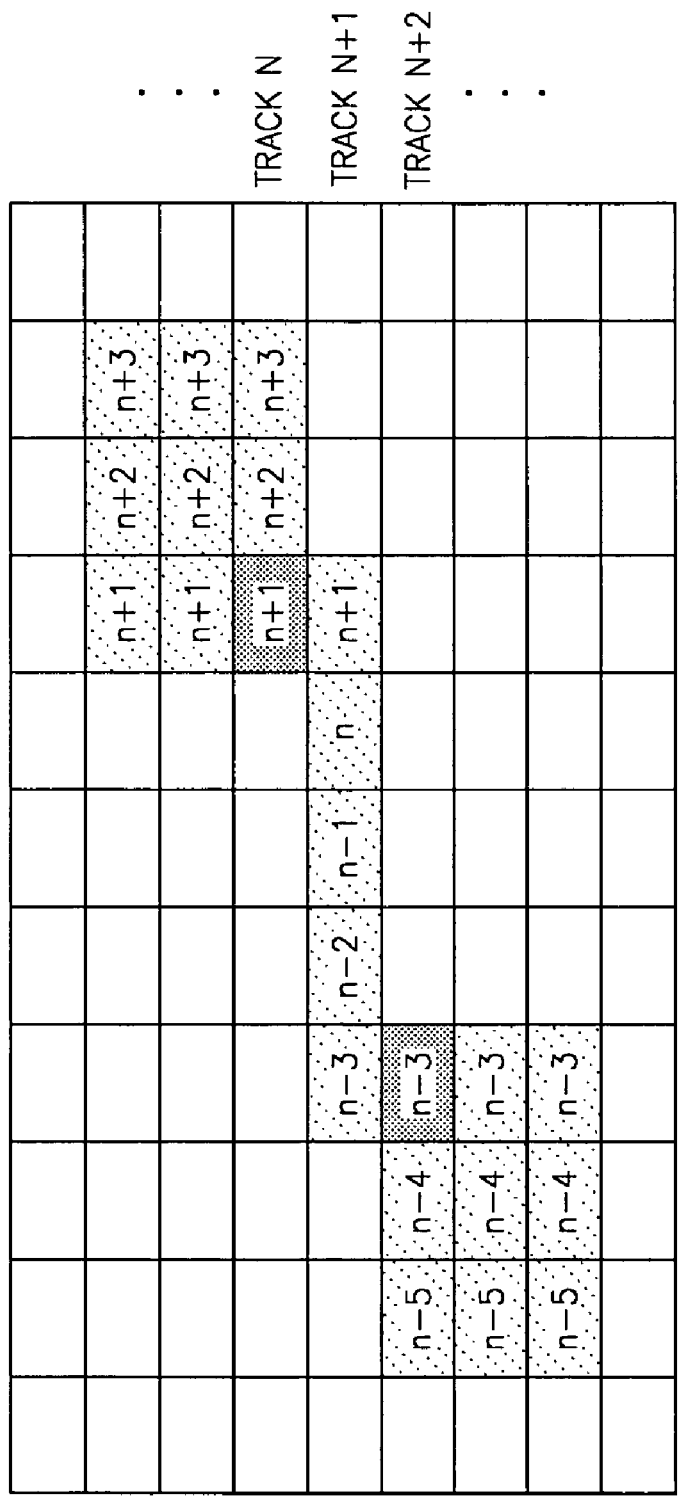
FIG. 5 is a diagram illustrating a hard disk where every other track has a defective sector.

FIG. 5 is a diagram illustrating a hard disk where every other track has a defective sector. Referring to FIG. 5, let us assume that defect information indicating that an n+1-th sector of an N-th track and an n−3-th sector of an N+2-th track are defective is read from a defect list. Then, it is checked whether a difference between n+1 and n−3 or a distance between the n+1-th sector and n−3-th sector of each track is not larger than a predetermined scratch-treatment critical value. If the difference between n+1 and n−3, i.e., 4, is not larger than the scratch-treatment critical value, sectors between the n+1-th sector of the N-th track and the n−3-th sector of the N+2-th track, i.e., n−3-th, n−2-th, n−1-th, n-th, and n+1-th sectors of an N+1-th track, are set as alleged defective sectors and treated as a scratch. In addition, sectors around the n−3-th sector of the N+2-th track, i.e., n−5-th and n−4-th of the N+2-th track, n−5-th, n−4-th, and n−3-th sectors of an N+3-th track, and n−5-th, n−4-th, and n−3-th sectors of an N+4-th track, are also set as alleged defective sectors and then treated as a scratch. Furthermore, sectors around the n+1-th sector of the N-th track, i.e., n+2-th and n+3-th sectors of the N-th track, n+1-th, n+2-th, and n+3-th sectors of an N−1-th track, and n+1-th, n+2-th, and n+3-th sectors of an N−2-th track, are also set as alleged defective sectors and then treated as a scratch.

As described above, if a defective sector exists in every other track of a hard disk, i.e., if N=M+2, the scratch-treatment critical value is set to 1% through a considerable number of experiments so that scratches on the hard disk can be more efficiently treated. The scratch-treatment critical value, however, may also be set to a different value.

Figure 6:
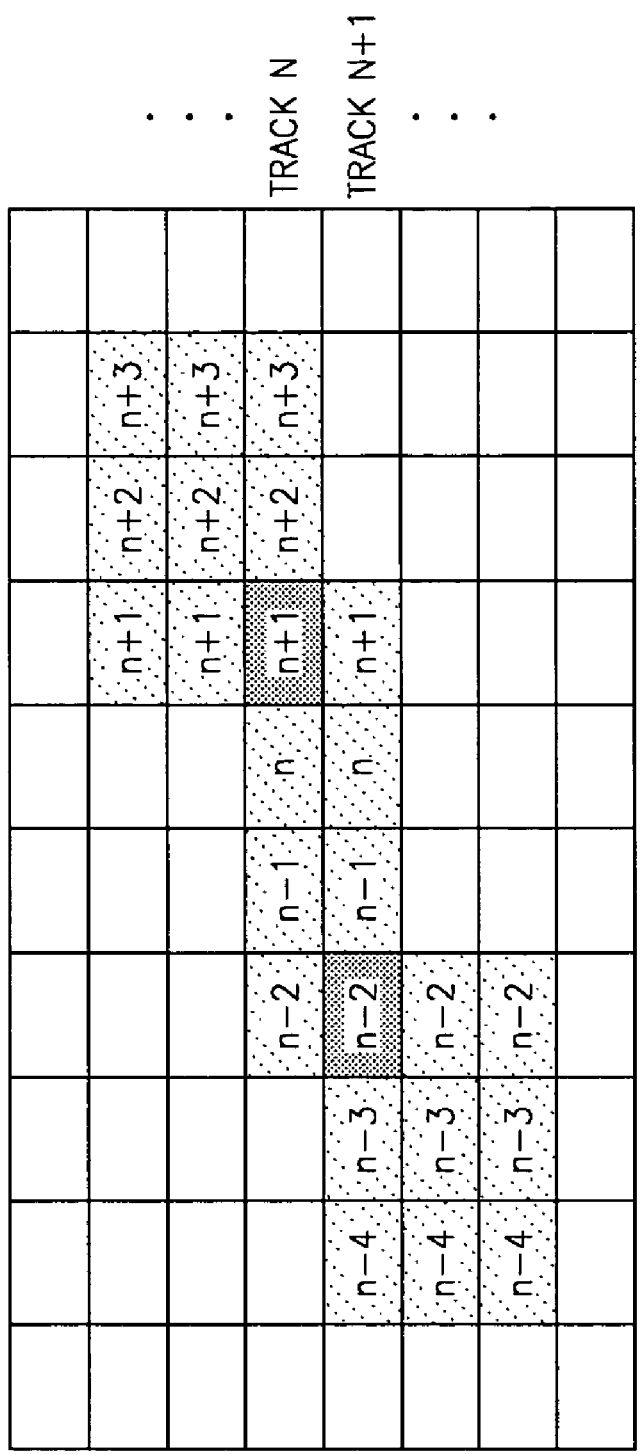
FIG. 6 is a diagram illustrating a hard disk where two adjacent tracks have a defective sector.

FIG. 6 is a diagram illustrating a hard disk where two adjacent tracks have a defective sector. Referring to FIG. 6, let us assume that defect information indicating that an n+1-th sector of an N-th track and an n−2-th sector of an N+1-th track are defective is read from a defect list. Then, it is checked whether a difference between n+1 and n−2 or a distance between the n+1-th sector and n−2-th sector of each track is not larger than a predetermined scratch-treatment critical value. If the difference between n+1 and n−2, i.e., 3, is not larger than the scratch-treatment critical value, sectors between the n+1-th sector of the N-th track and the n−2-th sector of the N+1-th track, i.e., n−2-th, n−1-th, and n-th sectors of the N-th track and n−1-th, n-th, and n+1-th sectors of the N+1-th track, are set as alleged defective sectors and treated as a scratch. In addition, sectors around the n−2-th sector of the N+1-th track, i.e., n−4-th and n−3-th of the N+1-th track, n−4-th, n−3-th, and n−2-th sectors of an N+2-th track, and n−4-th, n−3-th, and n−2-th sectors of an N+3-th track, are also set as alleged defective sectors and then treated as a scratch. Furthermore, sectors around the n+1-th sector of the N-th track, i.e., n+2-th and n+3-th sectors of the N-th track, n+1-th, n+2-th, and n+3-th sectors of an N−1-th track, and n+1-th, n+2-th, and n+3-th sectors of an N−2-th track, are also set as alleged defective sectors and then treated as a scratch.

As described above, if two adjacent tracks of a hard disk have a defective sector, i.e., if N=M+1, the scratch-treatment critical value is set to 3%, which is obtained through a considerable number of experiments, so that scratches on the hard disk can be more efficiently treated. The scratch-treatment critical value, however, may also be set to a different value.

Figure 7:
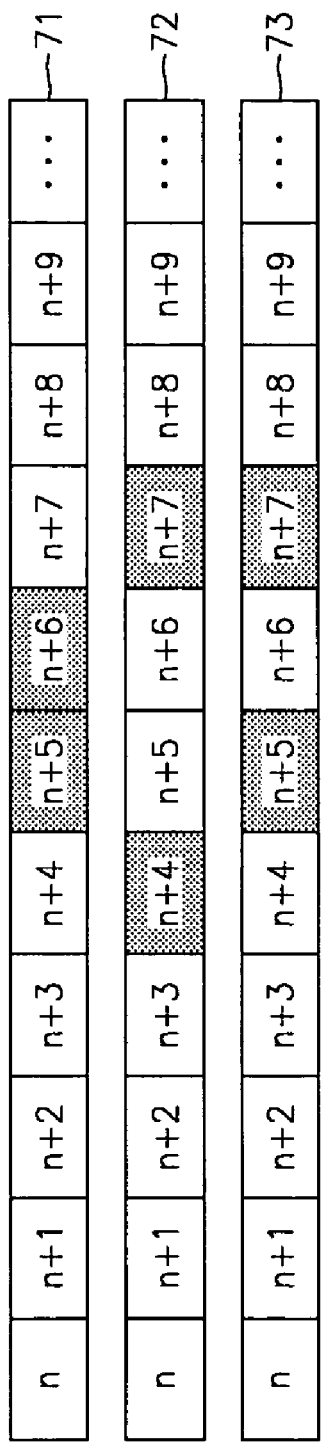
FIG. 7 is a diagram illustrating a hard disk on which a track has a plurality of defective sectors.

FIG. 7 is a diagram illustrating a hard disk where a track has a plurality of defective sectors.

If a track of a hard disk has more than one defective sector, i.e., if M=N, then the defective sectors are supposed to be horizontally arranged along the track direction of the hard disk. On the other hand, if defective sectors have the same address, i.e., if m=n, then the defective sectors are supposed to be vertically arranged along a direction perpendicular to the track direction of the hard disk, in which case the defective sectors can be treated as a scratch using a conventional algorithm. In addition, this case is very similar to the case of FIGS. 5 or 6, and thus only the occasion when the defective sectors are horizontally arranged along the track direction of the hard disk will be described in greater detail in the following paragraphs.

In the example of a first track 71 of FIG. 7, let us assume that defect information indicating that n+5-th and n+6-th sectors of the first track 71 are defective is read from a defect list. Since the n+5-th and n+6-th sectors are adjacent to each other, i.e., since there is no in-between sector, only sectors around the n+5-th and n+6-th sectors need to be set as alleged defective sectors. Here, if a scratch-treatment critical value is set to 3 (on the assumption that a usual scratch stretches over four sectors), an n+4-th sector and an n+7-th sector are set as alleged defective sectors and then treated as a scratch.

In the example of a second track 72 of FIG. 7, let us assume that defect information indicating that n+4-th and n+7-th sectors of the second track 72 are defective is read from a defect list. Here, if a scratch-treatment critical value is set to 3 (on the assumption that a usual scratch stretches over four sectors), the n+4-th sector and the n+7-th sector supposedly correspond to both ends of a scratch. Accordingly, only sectors between the n+4-th sector and the n+7-th sector, i.e., n+5-th and n+6-th sectors, need to be set as alleged defective sectors.

In the example of a third track 73 of FIG. 7, let us assume that defect information indicating that n+5-th and n+7-th sectors of the third track 73 are defective is read from a defect list. Here, if a scratch-treatment critical value is set to 3 (on the assumption that a usual scratch stretches over four sectors), an n+6-th sector, which is between the n+5-th sector and the n+7-th sector, is set as an alleged defective sector, and then an n+4-th sector and an n+8-th sector are also set as alleged defective sectors. Thereafter, all the alleged defective sectors are treated as a scratch.

Figure 8A:
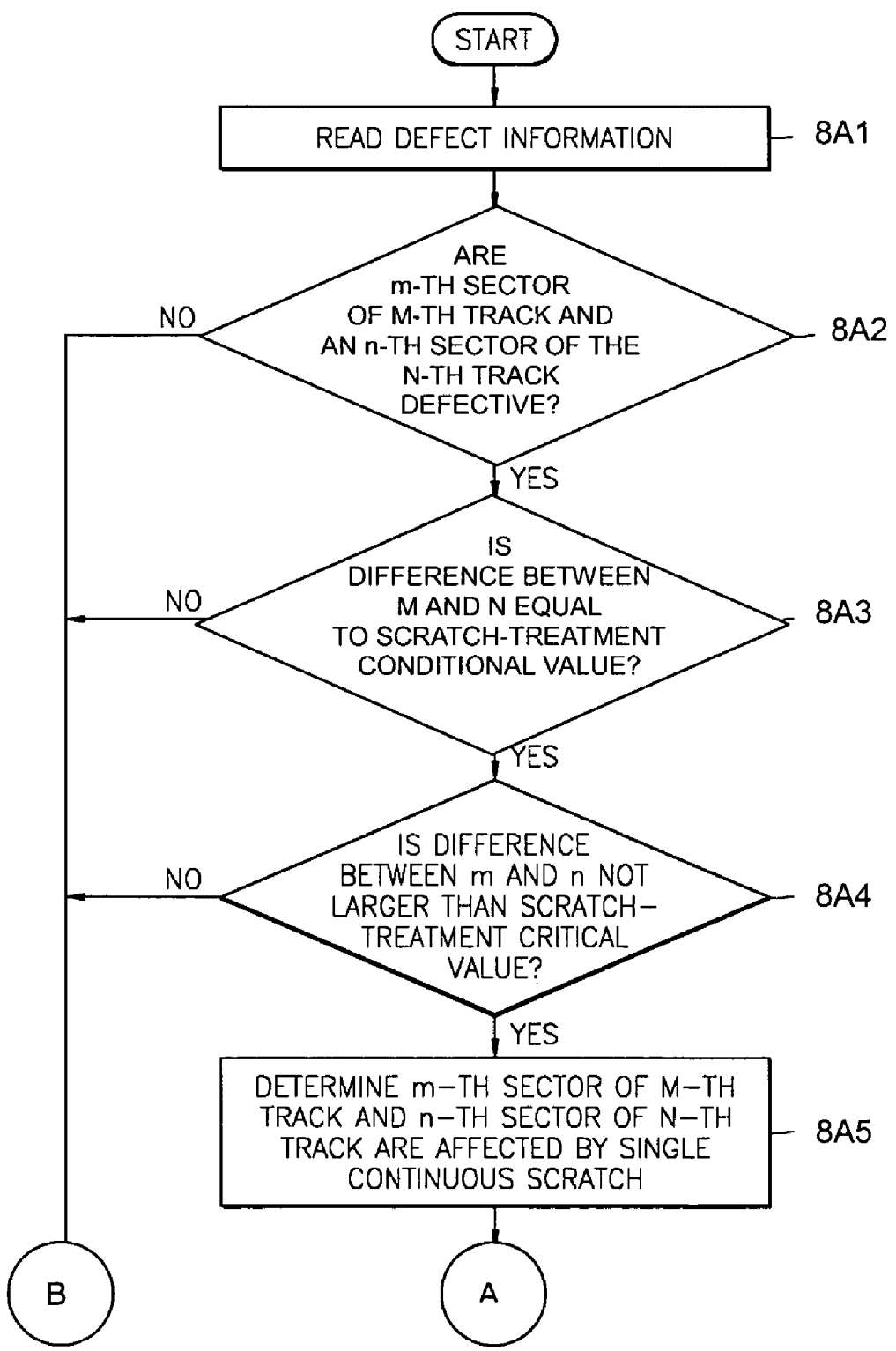
FIG. 8A is a flowchart of a method of managing random-directional scratches on a hard disk according to an embodiment of the present invention.
Figure 8B:
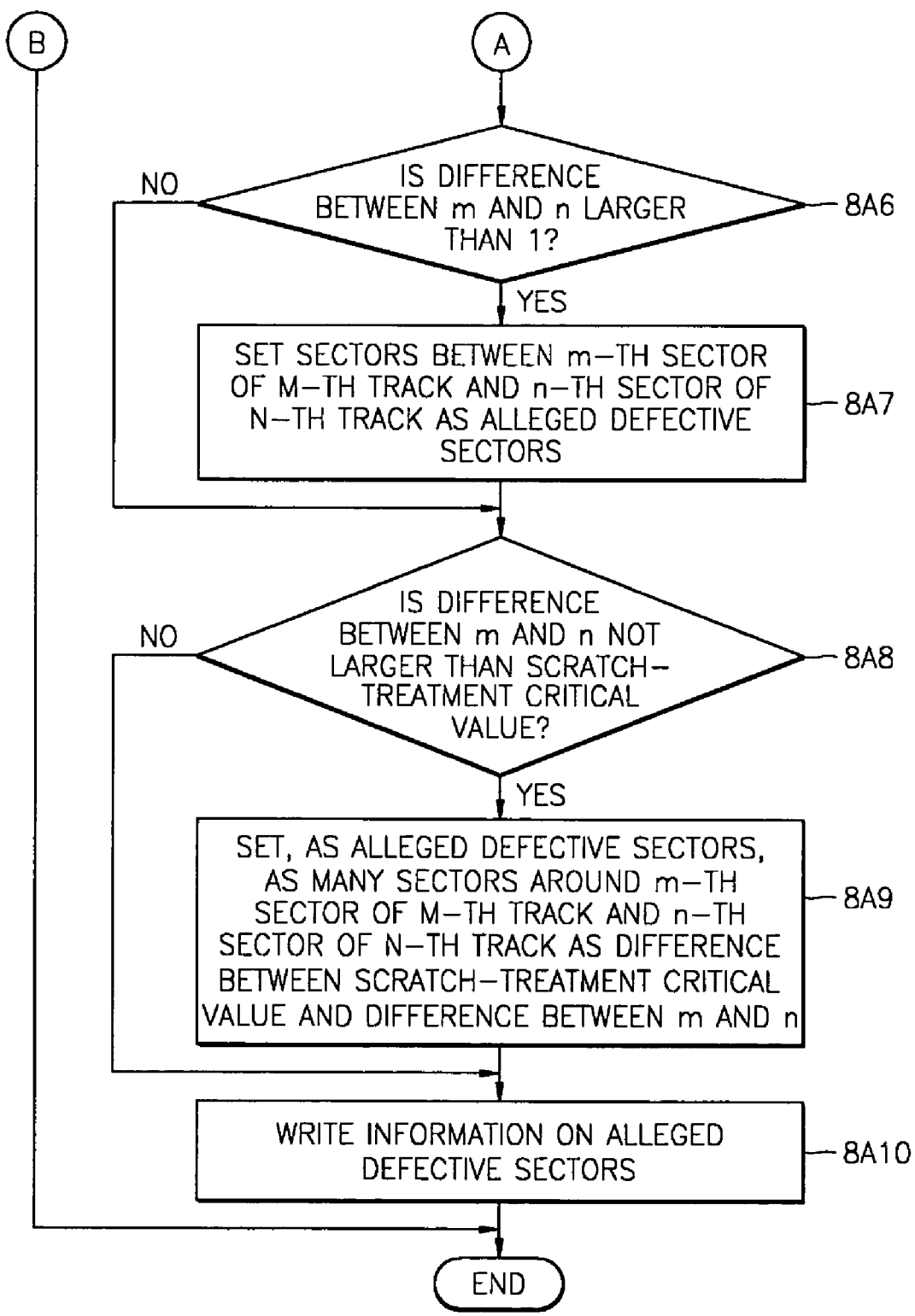
FIG. 8B is a flowchart of a method of managing slant-line-directional scratches on a hard disk according to an embodiment of the present invention.

FIG. 8A and FIG. 8B illustrate flowcharts of a method of managing random-directional scratches on a hard disk according to an embodiment of the present invention. Referring to FIG. 8A, in operation 8A1, defect information is read from memory where a predetermined defect list is stored. If an m-th sector of an M-th track and an n-th sector of an N-th track are defective (operation 8A2), it is determined in operation 8A3 whether a difference between M and N is equal to a predetermined scratch treatment conditional value. If the difference between M and N is equal to the predetermined scratch treatment conditional value, it is determined in operation 8A4 whether a difference between m and n is not larger than a predetermined scratch-treatment critical value. If the difference between m and n is not larger than the predetermined scratch-treatment critical value, the m-th and n-th sectors are determined to be affected by a single continuous scratch, in operation 8A5. Here, the scratch treatment conditional value is a benchmark value for determining whether the M-th track and the N-th track are affected by a single continuous scratch, and the scratch-treatment critical value is a benchmark value for determining whether the m-th sector and the n-th sector are affected by a single continuous scratch.

Referring to FIG. 8B, if the m-th and n-th sectors are determined to be affected by a single continuous scratch and the difference between m and n is larger than 1 (operation 8A6), sectors between the m-th sector of the M-th track and the n-th sector of the N-th track are set as alleged defective sectors in operation 8A7. Thereafter, in operation 8A8, it is checked whether the difference between m and n is smaller than the scratch-treatment critical value. If the difference between m and n is smaller than the scratch-treatment critical value, predetermined sectors around the m-th sector of the M-th track and predetermined sectors around the n-th sector of the N-th track are set as alleged defective sectors in operation 8A9. Here, as many sectors around the m-th sector of the M-th track or the n-th sector of the N-th track as a difference between the scratch-treatment critical value and the difference between m and n are set as alleged defective sectors. Thereafter, in operation 8A10, information on the alleged defective sectors is written on the memory where the defect list is stored.

Here, if M≠N and m≠n, the single continuous scratch that is believed to have affected the m-th sector of the M-th track and the n-th sector of the N-th track extends along a slant-line direction with respect to the track direction of the hard disk, and the gradient of the single continuous scratch increases in proportion to the difference between M and N. It has been experimentally proved that the efficiency of scratch treatment can be maximized by setting the scratch-treatment critical value to 1% of the number of tracks in each track of the hard disk when N=M+2 or by setting the scratch-treatment critical value to 3% of the number of tracks in each track of the hard disk when N=M+1. If M=N, the single continuous scratch is supposed to horizontally extend along the track direction of the hard disk. If m=n, the single continuous scratch is supposed to extend along a direction perpendicular to the track direction of the hard disk.

Figure 8C:
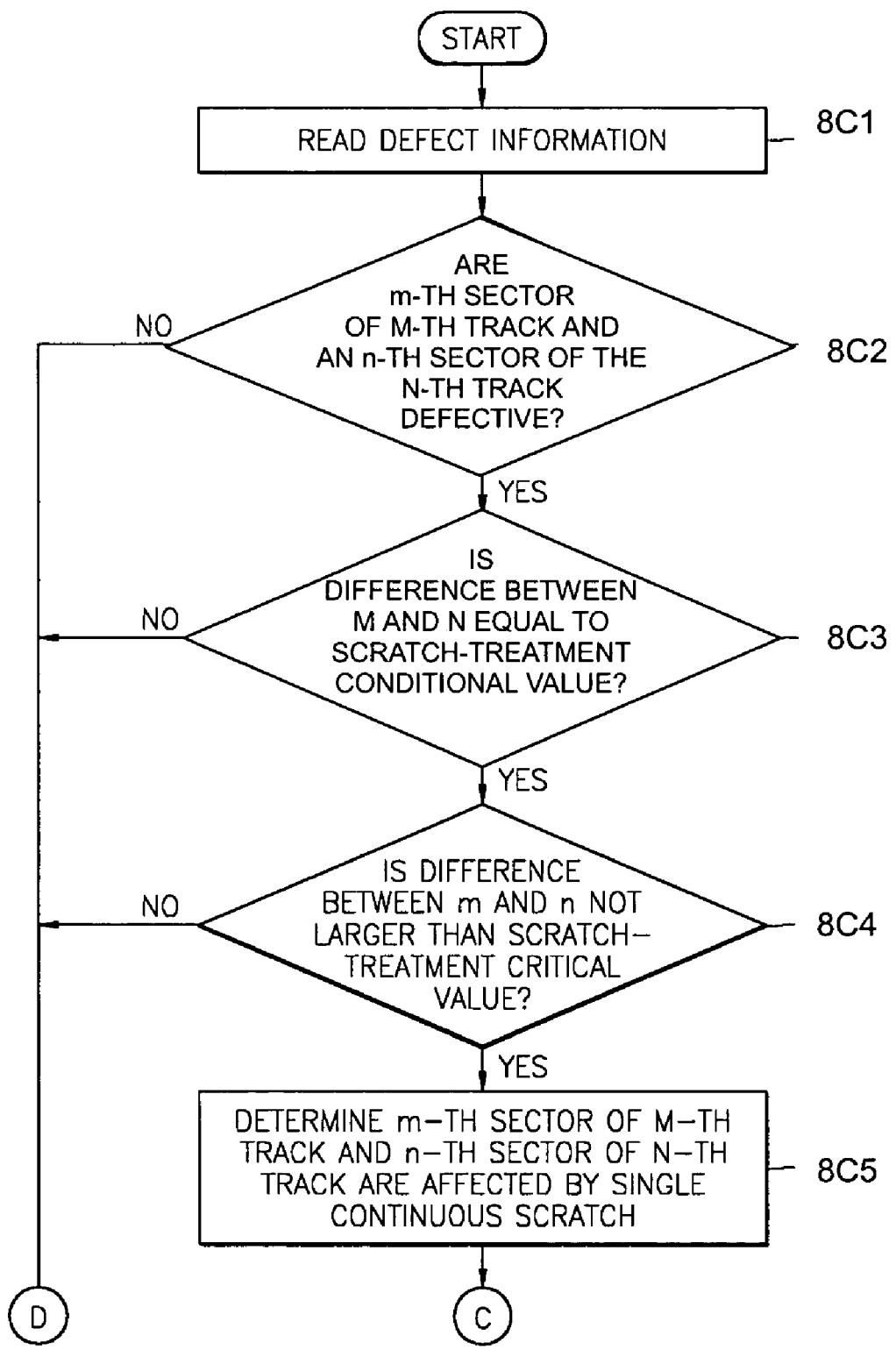
FIG. 8C is a flowchart of a method of managing slant-line-directional scratches on a hard disk according to an embodiment of the present invention.
Figure 8D:
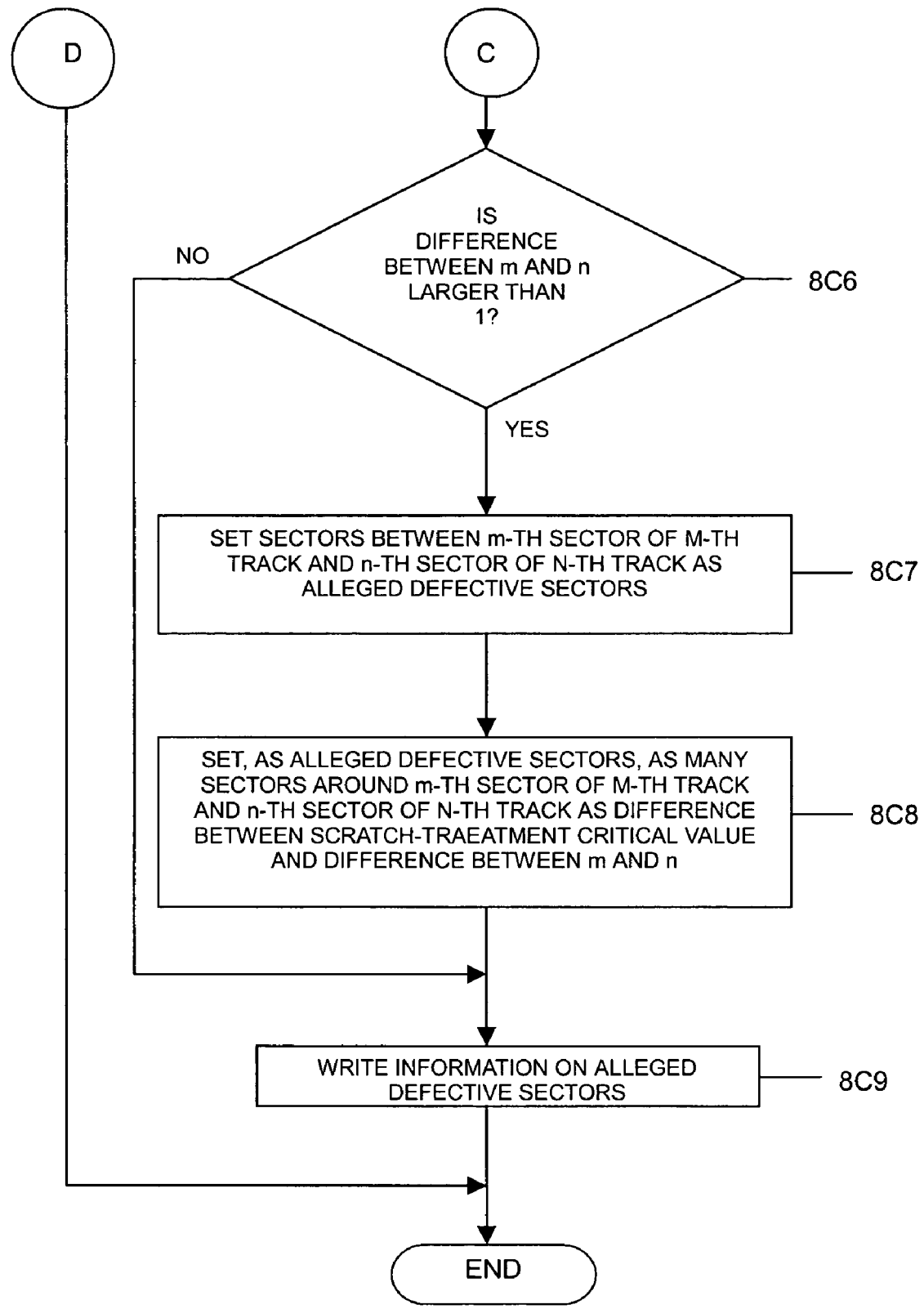
FIG. 8D is a flowchart of a method of managing slant-line-directional scratches on a hard disk according to an embodiment of the present invention.

FIG. 8C and FIG. 8D illustrate flowcharts of a method of managing slant-line-directional scratches on a hard disk according to an embodiment of the present invention. Referring to FIG. 8C, in operation 8C1, defect information is read from memory where a predetermined defect list is stored. If an m-th sector of an M-th track and an n-th sector of an N-th track are defective (operation 8C2), it is determined in operation 8C3 whether a difference between M and N is equal to a predetermined scratch treatment conditional value. If the difference between M and N is equal to the predetermined scratch treatment conditional value, it is determined in operation 8C4 whether a difference between m and n is not larger than a predetermined scratch-treatment critical value. If the difference between m and n is not larger than the predetermined scratch-treatment critical value, it is determined that the m-th sector of the M-th track and the n-th sector of the N-th track are determined to be affected by a single continuous scratch, in operation 8C5. Here, the scratch treatment conditional value is a benchmark value for determining whether the M-th track and the N-th track are affected by a single continuous scratch, and the scratch-treatment critical value is a benchmark value for determining whether the m-th sector and the n-th sector are affected by a single continuous scratch.

Referring to FIG. 8D, if the m-th and n-th sectors are determined to be affected by a single continuous scratch and the difference between m and n is larger than 1 (operation 8C6), sectors between the m-th sector of the M-th track and the n-th sector of the N-th track are set as alleged defective sectors in operation 8C7. Thereafter, in operation 8C8, predetermined sectors around the m-th sector of the M-th track and predetermined sectors around the n-th sector of the N-th track are set as alleged defective sectors. Here, as many sectors around the m-th sector of the M-th track or the n-th sector of the N-th track as a difference between the scratch-treatment critical value and the difference between m and n are set as alleged defective sectors. Thereafter, in operation 8C9, information on the alleged defective sectors is written on the memory where the defect list is stored.

Figure 9:
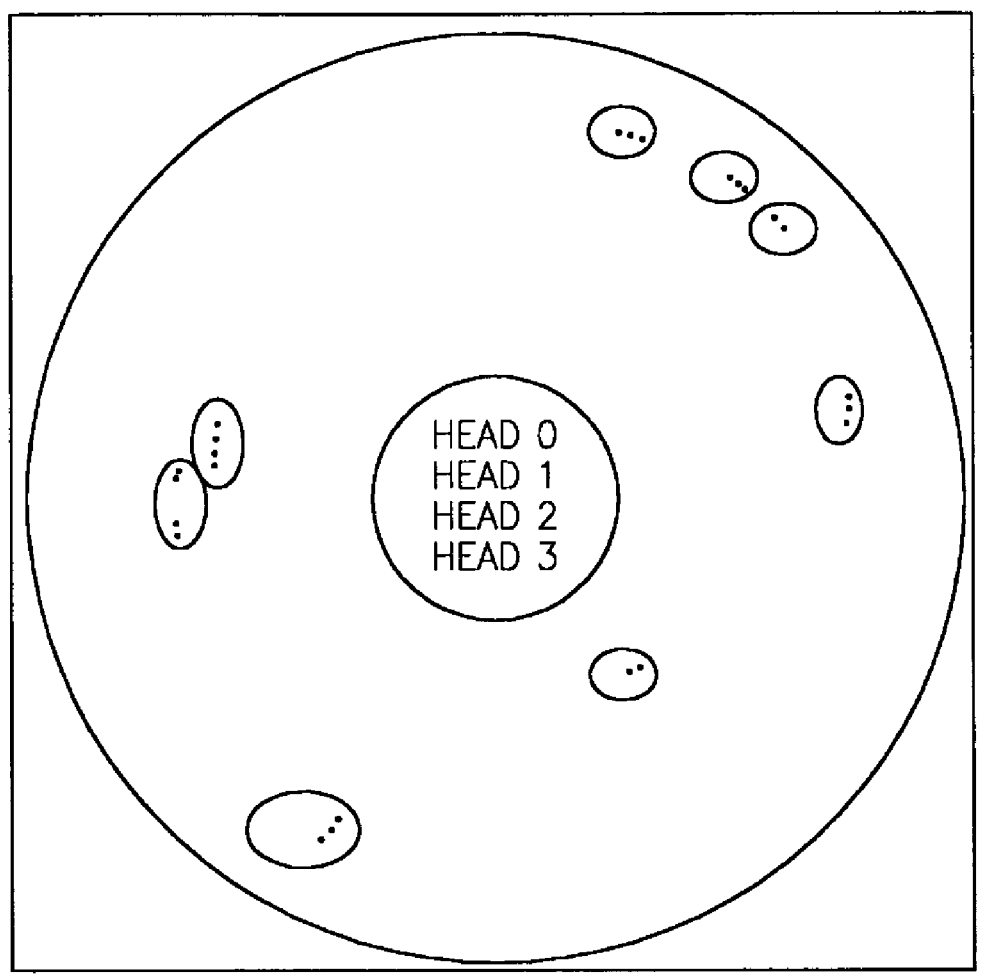
FIG. 9 is a diagram illustrating a defect map of a hard disk to which the present invention is yet to be applied.

FIG. 9 is a diagram illustrating a defect map of a hard disk to which the present invention is to be applied. A defect map of a hard disk indicates defects on the hard disk. The defect map is stored in a predetermined place, such as a maintenance cylinder of the hard disk, which can hardly be accessed by an ordinary user, and is referred to by a controller when operating a hard disk drive. In FIG. 9, defects on a hard disk are illustrated as dots in encircled areas. Such defects or defective sectors are marked by dots in FIG. 9. However, given that scratches usually extend long and continuously, sectors between such dots could also be defective even though they are not marked by dots.

Figure 10:
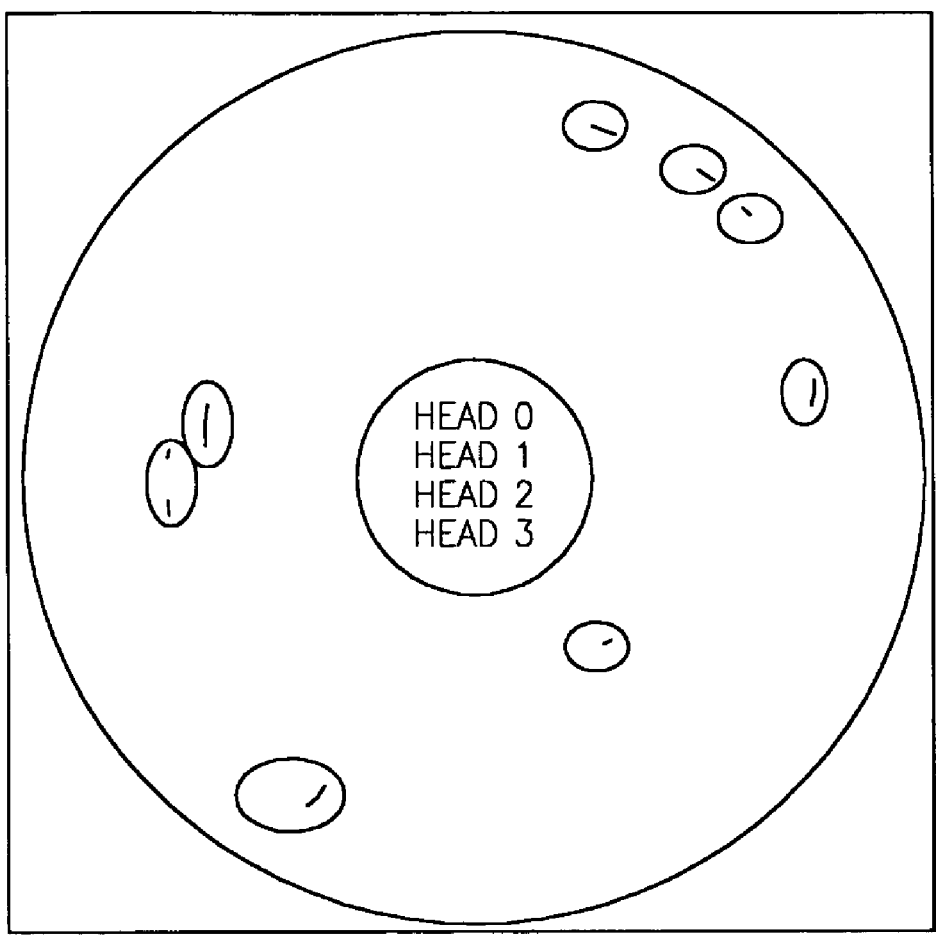
FIG. 10 is a diagram illustrating a defect map of a hard disk to which the present invention has already been applied.

FIG. 10 is a diagram illustrating a defect map of a hard disk to which the present invention has already been applied. By applying the present invention to a hard disk having the defect map of FIG. 9, the defect map of FIG. 10 can be obtained. While defects are marked by dots in FIG. 9, they are marked by single scratches because in the present invention, sectors between adjacent defective sectors are also treated as alleged defective sectors and then the defective sectors and the alleged defective sectors are treated alike. Therefore, according to the present invention, it is possible to improve the reliability of a hard disk in terms of recording data.

The above-described embodiments of the present invention can be realized on a general purpose digital computer using a computer-readable medium. The computer readable medium may be a storage media, such as a magnetic storage medium (for example, a ROM, a floppy disc, or a hard disc) or an optical readable medium (for example, a CD-ROM or DVD).

According to the present invention, it is possible for a user to skip sectors that are alleged to be defective because of scratches on a hard disk and to write data on or read data from normal sectors by anticipating and appropriately managing the alleged defective sectors. Therefore, it is also possible to minimize defect errors that could occur at the hard disk and enhance the quality of the hard disk.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. An apparatus to manage random-directional scratches on a hard disk, comprising:
   a computer comprising
      a scratch determination unit which determines an m-th sector of an M-th track and an n-th sector of an N-th track to be affected by a single continuous scratch if the m-th sector of the M-th track and the n-th sector of the N-th track are defective, a difference between M and N is equal to a predetermined scratch treatment conditional value, and a difference between m and n is not larger than a predetermined scratch-treatment critical value;
      an in-between alleged defect setting unit which sets sectors between the m-th sector of the M-th track and the n-th sector of the N-th track as alleged defective sectors if the m-th sector of the M-th track and the n-th sector of the N-th track are determined to be affected by the single continuous scratch and the difference between m and n is larger than 1; and
      an either-end alleged defect setting unit which sets predetermined sectors around the m-th sector of the M-th track and the n-th sector of the N-th track as alleged defective sectors if the m-th sector of the M-th track and the n-th sector of the N-th track are determined to be affected by the single continuous scratch and the difference between m and n is smaller than the scratch-treatment critical value.

2. The apparatus of claim 1, further comprising:
   a defect information reading unit which reads information on defective sectors from memory where a predetermined defect list is stored; and
   an alleged defect information writing unit which writes information on the alleged defective sectors set by the in-between alleged defect setting unit and the either-end alleged defect setting unit on the memory where the predetermined defect list is stored.

3. The apparatus of claim 1, wherein the either-end alleged defect setting unit sets a number of sectors equal to the difference between the scratch-treatment critical value and the difference between m and n as the alleged defective sectors.

4. The apparatus of claim 1, wherein the M-th track and the N-th track have a same number of sectors.

5. The apparatus of claim 4, wherein the scratch-treatment conditional value is a benchmark value determining whether the M-th track and the N-th track are affected by a single continuous scratch, and the scratch-treatment critical value is a critical value determining whether the m-th sector and the n-th sector are affected by the single continuous scratch.

6. The apparatus of claim 5, wherein if M and N are different from each other and m and n are also different from each other, the single continuous scratch extends along a slant-line direction with respect to a track direction of the hard disk and its gradient increases in proportion to the difference between M and N.

7. An apparatus to manage random-directional scratches on a hard disk, comprising:
   a computer comprising
      a scratch determination unit which determines an m-th sector of an M-th track and an n-th sector of an N-th track to be affected by a single continuous scratch if the m-th sector of the M-th track and the n-th sector of the N-th track are defective, a difference between M and N is equal to a predetermined scratch treatment conditional value, and a difference between m and n is not larger than a predetermined scratch-treatment critical value; and
      an alleged defect setting unit which sets sectors between the m-th sector of the M-th track and the n-th sector of the N-th track as alleged defective sectors, if the m-th sector of the M-th track and the n-th sector of the N-th track are determined to be affected by the single continuous scratch and the difference between m and n is larger than 1, and sets predetermined sectors around the m-th sector of the M-th track and the n-th sector of the N-th track as alleged defective sectors if the m-th sector of the M-th track and the n-th sector of the N-th track are determined to be affected by the single continuous scratch and the difference between m and n is smaller than the scratch-treatment critical value.

8. The apparatus of claim 7, further comprising:
   a defect information reading unit which reads information on defective sectors from memory where a predetermined defect list is stored; and
   an alleged defect information writing unit which writes information on the alleged defective sectors set by the alleged defect setting unit on the memory where the predetermined defect list is stored.

9. The apparatus of claim 8, wherein the alleged defect setting unit sets a number of sectors equal to the difference between the scratch-treatment critical value and the difference between m and n as the alleged defective sectors.

10. The apparatus of claim 8, wherein the M-th track and the N-th track have a same number of sectors.

11. The apparatus of claim 10, wherein the scratch-treatment conditional value is a benchmark value determining whether the M-th track and the N-th track are affected by a single continuous scratch, and the scratch-treatment critical value is a critical value determining whether the m-th sector and the n-th sector are affected by a single continuous scratch.

12. A method of managing random-directional scratches on a hard disk, comprising:
   determining an m-th sector of an M-th track and an n-th sector of an N-th track to be affected by a single continuous scratch if the m-th sector of the M-th track and the n-th sector of the N-th track are defective, a difference between M and N is equal to a predetermined scratch treatment conditional value, and a difference between m and n is not larger than a predetermined scratch-treatment critical value;
   setting sectors between the m-th sector of the M-th track and the n-th sector of the N-th track as alleged defective sectors if the m-th sector of the M-th track and the n-th sector of the N-th track are determined to be affected by the single continuous scratch and the difference between m and n is larger than 1; and
   setting predetermined sectors around the m-th sector of the M-th track and the n-th sector of the N-th track as the alleged defective sectors if the m-th sector of the M-th track and the n-th sector of the N-th track are determined to be affected by the single continuous scratch and the difference between m and n is smaller than the scratch-treatment critical value.

13. The method of claim 12, further comprising:
reading information on defective sectors from memory where a predetermined defect list is stored; and
writing information on the alleged defective sectors on the memory where the predetermined defect list is stored.

14. The method of claim 12, wherein the setting of the predetermined sectors comprises setting as many sectors as the difference between the scratch-treatment critical value and the difference between m and n as the alleged defective sectors.

15. The method of claim 12, wherein the M-th track and the N-th track have the same number of sectors.

16. The method of claim 15, wherein the scratch-treatment conditional value is a benchmark value determining whether the M-th track and the N-th track are affected by a single continuous scratch, and the scratch-treatment critical value is a critical value determining whether the m-th sector and the n-th sector are affected by the single continuous scratch.

17. The method of claim 16, wherein if M and N are different from each other and m and n are also different from each other, the single continuous scratch extends along a slant-line direction with respect to a track direction of the hard disk and its gradient increases in proportion to the difference between M and N.

18. A method of managing random-directional scratches on a hard disk, comprising:
determining an m-th sector of an M-th track and an n-th sector of an N-th track to be affected by a single continuous scratch if the m-th sector of the M-th track and the n-th sector of the N-th track are defective, a difference between M and N is equal to a predetermined scratch treatment conditional value, and a difference between m and n is not larger than a predetermined scratch-treatment critical value; and
setting sectors between the m-th sector of the M-th track and the n-th sector of the N-th track as alleged defective sectors, if the m-th sector of the M-th track and the n-th sector of the N-th track are determined to be affected by the single continuous scratch and the difference between m and n is larger than 1, and sets predetermined sectors around the m-th sector of the M-th track and the n-th sector of the N-th track as alleged defective sectors if the m-th sector of the M-th track and the n-th sector of the N-th track are determined to be affected by the single continuous scratch and the difference between m and n is smaller than the scratch-treatment critical value.

19. The method of claim 18 further comprising:
reading information on defective sectors from memory where a predetermined defect list is stored; and
writing information on the alleged defective sectors on the memory where the predetermined defect list is stored.

20. The method of claim 19, wherein the setting of the sectors comprises setting as the alleged defective sectors a number of sectors equal to the a difference between the scratch-treatment critical value and the difference between m and n.

21. The method of claim 19, wherein the M-th track and the N-th track have a same number of sectors.

22. The method of claim 19, wherein the scratch-treatment conditional value is a benchmark value determining whether the M-th track and the N-th track are affected by the single continuous scratch, and the scratch-treatment critical value is a critical value determining whether the m-th sector and the n-th sector are affected by the single continuous scratch.

23. A computer readable storage medium controlling a computer and comprising a process of:
selecting sectors of a plurality of tracks from a defect list of a hard disk;
comparing a difference in the selected sectors to at least one predetermined value; and
designating alleged defective sectors as a plurality of sectors around and between the selected sectors based on a result of the comparing,
wherein the comparing further comprises:
comparing a first difference between a first track and a second track to a scratch-treatment conditional value; and
comparing a second difference between a first sector and a second sector to a scratch-treatment critical value, wherein when the first difference is equal to the scratch-treatment conditional value and the second difference is smaller than the scratch-treatment critical value the sectors are determined to have been damaged by a single continuous scratch.

24. The process of claim 23, wherein the designating further comprises:
setting the sectors between the selected sectors as alleged defective sectors and setting a cluster of sectors around the selected sectors as alleged defective sectors when the second difference is greater than 1.

25. The process of claim 23, wherein the designating further comprises:
setting the sectors between the selected sectors as the alleged defective sectors when the second difference is greater than 1; and
setting a cluster of sectors around the selected sectors as the alleged defective sectors when the second difference is smaller than the scratch-treatment critical value.

26. The process of claim 23, further comprising updating the defect list based on the designated alleged defective sectors.

27. A defect management device comprising:
a computer comprising
a sector identification unit to identify scratch sector defects based on sector defects that are caused by a continuous scratch on a hard disk; and
a defect manager setting sectors surrounding scratch sector defects as alleged defective sectors and stores the alleged defective sectors in a defect list on a memory,
wherein the defect manager further comprises:
a between defect manager that sets sectors between a first scratch sector defect and a second scratch sector defect as the alleged defective sectors when a difference between the first scratch sector and the second scratch sector defect is larger than 1; and
a cluster defect manager that sets a cluster of sectors around the first scratch sector defect and the second scratch sector defect as the alleged defective sectors when the difference between the first scratch sector defect and the second scratch sector defect is smaller than a scratch-treatment critical value.

* * * * *

UNITED STATES PATENT AND TRADEMARK OFFICE
CERTIFICATE OF CORRECTION

PATENT NO. : 7,617,419 B2 Page 1 of 1
APPLICATION NO. : 10/732248
DATED : November 10, 2009
INVENTOR(S) : Moon-Chol Park It is certified that error appears in the above-identified patent and that said Letters Patent is hereby corrected as shown below:

Column 13, Line 54, change "the a" to --a--.

Signed and Sealed this

Second Day of March, 2010

David J. Kappos
*Director of the United States Patent and Trademark Office*